United States Patent
Porco et al.

(10) Patent No.: US 7,720,449 B2
(45) Date of Patent: May 18, 2010

(54) FAULT-TOLERANT AMPLIFIER MATRIX

(75) Inventors: Ronald L. Porco, Fort Worth, TX (US); William C. Greenwood, Trophy Club, TX (US); Wentian Zhang, Keller, TX (US)

(73) Assignee: Motorola, Inc., Schaumburg, IL (US)

( * ) Notice: Subject to any disclaimer, the term of this patent is extended or adjusted under 35 U.S.C. 154(b) by 784 days.

(21) Appl. No.: 11/191,450

(22) Filed: Jul. 28, 2005

(65) Prior Publication Data

US 2007/0026899 A1 Feb. 1, 2007

(51) Int. Cl.
*H01Q 11/12* (2006.01)
*H04B 1/04* (2006.01)
*H04W 24/00* (2009.01)

(52) U.S. Cl. ............... 455/127.1; 455/423; 455/424; 455/562.1; 455/115.1; 455/124

(58) Field of Classification Search .............. 455/127.1, 455/423, 424, 562.1, 115; 330/124
See application file for complete search history.

(56) References Cited

U.S. PATENT DOCUMENTS

| 4,618,831 | A  | * | 10/1986 | Egami et al.     | 455/133   |
|-----------|----|---|---------|------------------|-----------|
| 5,675,285 | A  | * | 10/1997 | Winters          | 330/124 R |
| 5,783,969 | A  | * | 7/1998  | Luz              | 330/124 R |
| 5,834,972 | A  | * | 11/1998 | Schiemenz et al. | 330/124 R |
| 6,738,019 | B1 | * | 5/2004  | Luz et al.       | 342/373   |
| 7,127,220 | B2 | * | 10/2006 | Abrams et al.    | 455/127.5 |
| 7,139,539 | B2 | * | 11/2006 | Chun             | 455/127.1 |
| 2004/0228422 | A1 | * | 11/2004 | Silveira et al. | 375/299 |
| 2005/0227617 | A1 | * | 10/2005 | Hoffmann et al. | 455/13.3 |

\* cited by examiner

*Primary Examiner*—Matthew D Anderson
*Assistant Examiner*—Wen W Huang

(57) ABSTRACT

An amplifier matrix (112) has a plurality of inter-coupled matrix clusters (201), and a controller (106). The controller is programmed to detect (304) a fault in an amplification path of one of the matrix clusters, and update (316) vector relationships in the matrix clusters to minimize inter-sector isolation at the outputs of the matrix clusters.

20 Claims, 5 Drawing Sheets

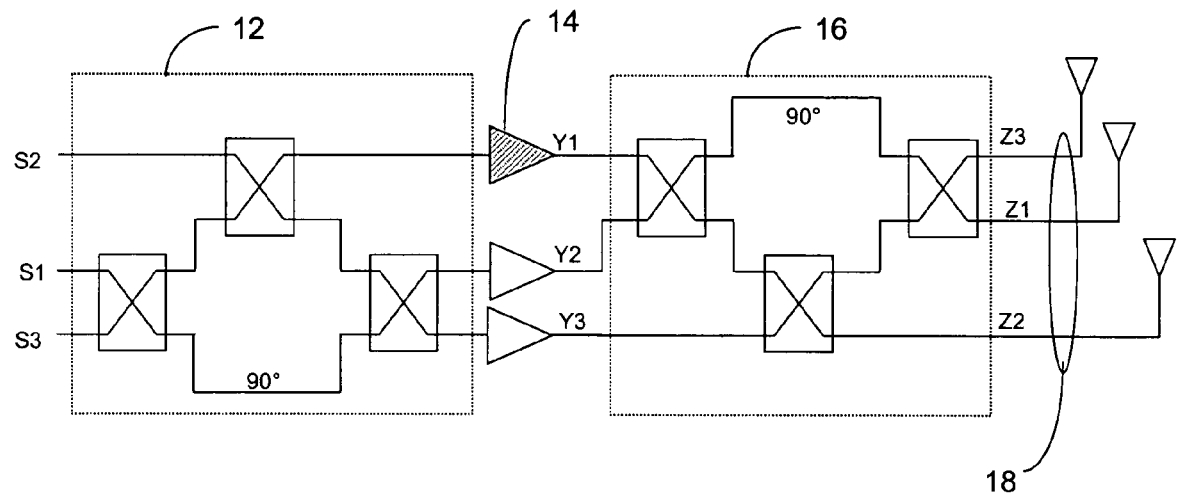
FIG. 1  *Prior Art*
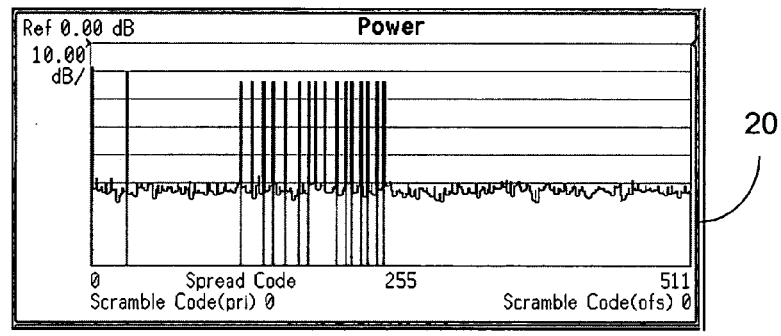
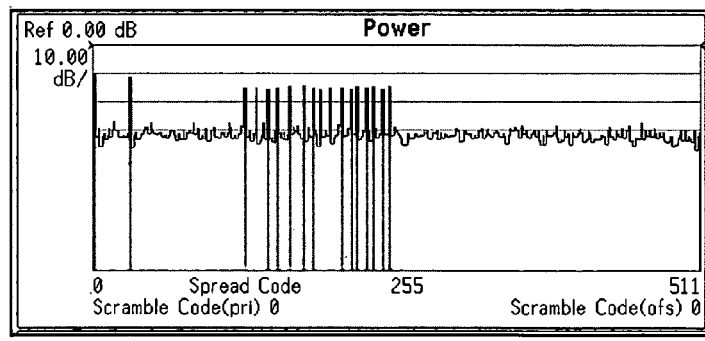
*Prior Art*
FIG. 2

| | Assume the desired powers at the antennae are: S1 = 40W, S2 = 30W, S3 = 10W | | | | | |
|---|---|---|---|---|---|---|
| | Un-modified Cluster | | | Modified Cluster (S3 removed & Z3 on CL A terminated) | | |
| | Z1 (CL A & CL B) | Z2 (CL A & CL B) | Z3 (CL A & CL B) | Z1 (CL A & CL B) | Z2 (CL A & CL B) | Z3 (CL A & CL B) |
| S1 (W) | 8.9 & 20 | 2.2 & 0 | 2.2 & 0 | 11.4 & 28.6 | 0 & 0 | 0 & 0 |
| S2 (W) | 1.7 & 0 | 6.7 & 15 | 1.7 & 0 | 0 & 0 | 8.6 & 21.4 | 0 & 0 |
| S3 (W) | 0.6 & 0 | 0.6 & 0 | 2.2 & 5 | 0 & 0 | 0 & 0 | 0 & 10 |
| Sector Pout (W) | 28.9 | 21.7 | 7.2 | 40 | 30 | 10 |
| Isolation (dBc) | -11 | -8.9 | -2.7 | -∞ | -∞ | -∞ |

FIG. 7

FAULT-TOLERANT AMPLIFIER MATRIX

FIELD OF THE INVENTION

This invention relates generally to amplification matrixes, and more particularly to a fault-tolerant amplifier matrix.

BACKGROUND OF THE INVENTION

Amplifier matrixes such as the well-known Butler matrix have been used in cellular base stations for quite some time. An illustration of a butler matrix used to evenly distribute power amongst three amplifiers 14 is provided in FIG. 1. Typically, a butler matrix has an input matrix portion 12, an output matrix portion 16, amplifiers 14 coupled therebetween, and antennas 18 coupled to the outputs of the output matrix.

Under normal conditions, the amplified outputs of the input portion 12 (i.e., outputs Y1 through Y3) have well-defined mathematical relationships such as, for example, $$\vec{Y}1 = \frac{1}{\sqrt{3}} \cdot \vec{S}1 \angle -90° + \frac{1}{\sqrt{3}} \cdot \vec{S}2 \angle 0° + \frac{1}{\sqrt{3}} \cdot \vec{S}3 \angle -180°$$

$$\vec{Y}2 = \frac{1}{\sqrt{3}} \cdot \vec{S}1 \angle 60° + \frac{1}{\sqrt{3}} \cdot \vec{S}2 \angle -90° + \frac{1}{\sqrt{3}} \vec{S}3 \angle -150°$$

$$\vec{Y}3 = \frac{1}{\sqrt{3}} \cdot \vec{S}1 \angle -150° + \frac{1}{\sqrt{3}} \cdot \vec{S}2 \angle -180° + \frac{1}{\sqrt{3}} \cdot \vec{S}3 \angle -120°$$

The outputs of the output portion 16 (i.e., outputs Z1 through Z3) have the following mathematical relationships:

$$\vec{Z}1 = \frac{1}{\sqrt{3}} \cdot \vec{Y}1 \angle -150° + \frac{1}{\sqrt{3}} \cdot \vec{Y}2 \angle 60° + \frac{1}{\sqrt{3}} \cdot \vec{Y}3 \angle -90°$$

$$\vec{Z}2 = \frac{1}{\sqrt{3}} \cdot \vec{Y}1 \angle -180° + \frac{1}{\sqrt{3}} \cdot \vec{Y}2 \angle -90° + \frac{1}{\sqrt{3}} \cdot \vec{Y}3 \angle 0°$$

$$\vec{Z}3 = \frac{1}{\sqrt{3}} \cdot \vec{Y}1 \angle -120° + \frac{1}{\sqrt{3}} \cdot \vec{Y}2 \angle -150° + \frac{1}{\sqrt{3}} \cdot \vec{Y}3 \angle -180°$$

Applying the Y equations to the Z equations produces the following relationships:

$$\vec{Z}1 = \frac{1}{3} \cdot \vec{S}1 \angle 120° + \frac{1}{3} \cdot \vec{S}2 \angle -150° + \frac{1}{3} \cdot \vec{S}3 \angle 30° +$$
$$\frac{1}{3} \cdot \vec{S}1 \angle 120° + \frac{1}{3} \cdot \vec{S}2 \angle -30° + \frac{1}{3} \cdot \vec{S}3 \angle -90° +$$
$$\frac{1}{3} \cdot \vec{S}1 \angle 120° + \frac{1}{3} \cdot \vec{S}2 \angle 90° + \frac{1}{3} \cdot \vec{S}3 \angle 150°$$
$$= \vec{S}1 \angle 120°$$

$$\vec{Z}2 = \frac{1}{3} \cdot \vec{S} \angle 90° + \frac{1}{3} \cdot \vec{S}2 \angle 180° + \frac{1}{3} \cdot \vec{S}3 \angle 0° +$$
$$\frac{1}{3} \cdot \vec{S}1 \angle -30° + \frac{1}{3} \cdot \vec{S}2 \angle 180° + \frac{1}{3} \cdot \vec{S}3 \angle 120° +$$
$$\frac{1}{3} \cdot \vec{S}1 \angle -150° + \frac{1}{3} \cdot \vec{S}2 \angle 180° + \frac{1}{3} \cdot \vec{S}3 \angle -120°$$
$$= \vec{S}2 \angle 180°$$

$$\vec{Z}3 = \frac{1}{3} \cdot \vec{S}1 \angle 150° + \frac{1}{3} \cdot \vec{S}2 \angle -120° + \frac{1}{3} \cdot \vec{S}3 \angle 60° +$$
$$\frac{1}{3} \cdot \vec{S}1 \angle -90° + \frac{1}{3} \cdot \vec{S}2 \angle 120° + \frac{1}{3} \cdot \vec{S}3 \angle 60° +$$
$$\frac{1}{3} \cdot \vec{S}1 \angle 30° + \frac{1}{3} \cdot \vec{S}2 \angle 0° + \frac{1}{3} \cdot \vec{S}3 \angle 60°$$
$$= \vec{S}3 \angle 60°$$

These equations reflect a desired isolation characteristic at the outputs of the output portion 16. FIG. 2 shows by way of example reference 20, which depicts the code domain power of a UMTS (Universal Mobile Telecommunications Service) signal at the output portion 16 with all amplifiers operating properly. Under normal operating conditions, for example, the EVM (Error Vector Magnitude) of the UMTS signal of output portion 16 is 5% and peak code domain error is −45.7 dB.

If, however, one of the amplifiers 14 experiences a fault which renders it inoperable, the operation of the Butler matrix can be impacted severely at all outputs of the output portion. This becomes evident in the case where the Y1 amplifier is removed from operation. Under these circumstances, the Z equations result in the following relationships:

$$\vec{Z}1 = \frac{2}{3} \vec{S}1 \angle 120° + \frac{1}{3} \vec{S}2 \angle 30° + \frac{1}{3} \vec{S}3 \angle -150°$$

$$\vec{Z}2 = \frac{1}{3} \vec{S}1 \angle -90° + \frac{2}{3} \vec{S}2 \angle 180° + \frac{1}{3} \vec{S}3 \angle 180°$$

$$\vec{Z}3 = \frac{1}{3} \vec{S} \angle -30° + \frac{1}{3} \vec{S}2 \angle 60° + \frac{2}{3} \vec{S}3 \angle 60°$$

As should be evident from these equations, sector-to-sector isolation degrades severely because of the residual terms between sectors. Consequently, a branch failure within a Butler matrix can cause major degradation in waveform quality at the outputs of the output portion 16. This can cause considerable, if not complete, failure in radio communications to all sectors. FIG. 2 shows by way of example reference 22, which depicts the code domain power of the UMTS signal at the output portion 16 with amplifier Y1 disabled. Under these conditions, the code domain noise has risen 20 dB compared to reference 20, and the EVM and peak code domain error of the UMTS signal of output portion 16 have degraded to 65.5% and −26.5 dB, respectively. A need therefore arises for a fault-tolerant amplifier matrix.

SUMMARY OF THE INVENTION

Embodiments in accordance with the invention provide a fault-tolerant amplifier matrix.

In a first embodiment of the present invention, an amplifier matrix has a plurality of inter-coupled matrix clusters, and a controller. The controller is programmed to detect a fault in an amplification path of one of the matrix clusters, and update vector relationships in the matrix clusters to minimize inter-sector isolation at the outputs of the matrix clusters.

In a second embodiment of the present invention, a computer-readable storage medium in an amplifier matrix has a plurality of matrix clusters. The storage medium includes computer instructions for detecting a fault in an amplification path of one of the matrix clusters, and updating vector relationships in the matrix clusters to minimize inter-sector isolation at the outputs of the matrix clusters.

In a third embodiment of the present invention, a base station has a controller, a receiver, and a transmitter. The transmitter has an amplifier matrix having a plurality of inter-coupled matrix clusters, and a plurality of antennas coupled to the outputs of the amplifier matrix for radiating message signals to selective call radios (SCRs). The controller is programmed to detect a fault in an amplification path of one of the matrix clusters, update vector relationships in the matrix clusters to minimize inter-sector isolation at the outputs of the matrix clusters, and radiate signals from the transmitter to one or more SCRs.

BRIEF DESCRIPTION OF THE DRAWINGS

FIG. 1 is a block diagram of a prior art Butler matrix in a cellular system.

FIG. 2 depicts measurements of the prior art Butler matrix of FIG. 1 before and after a fault in said system.

FIG. 7 depicts a table comparing operating results of the transmitter before and after a fault is corrected in accordance with embodiments of the present invention.

DETAILED DESCRIPTION

Figure 3:
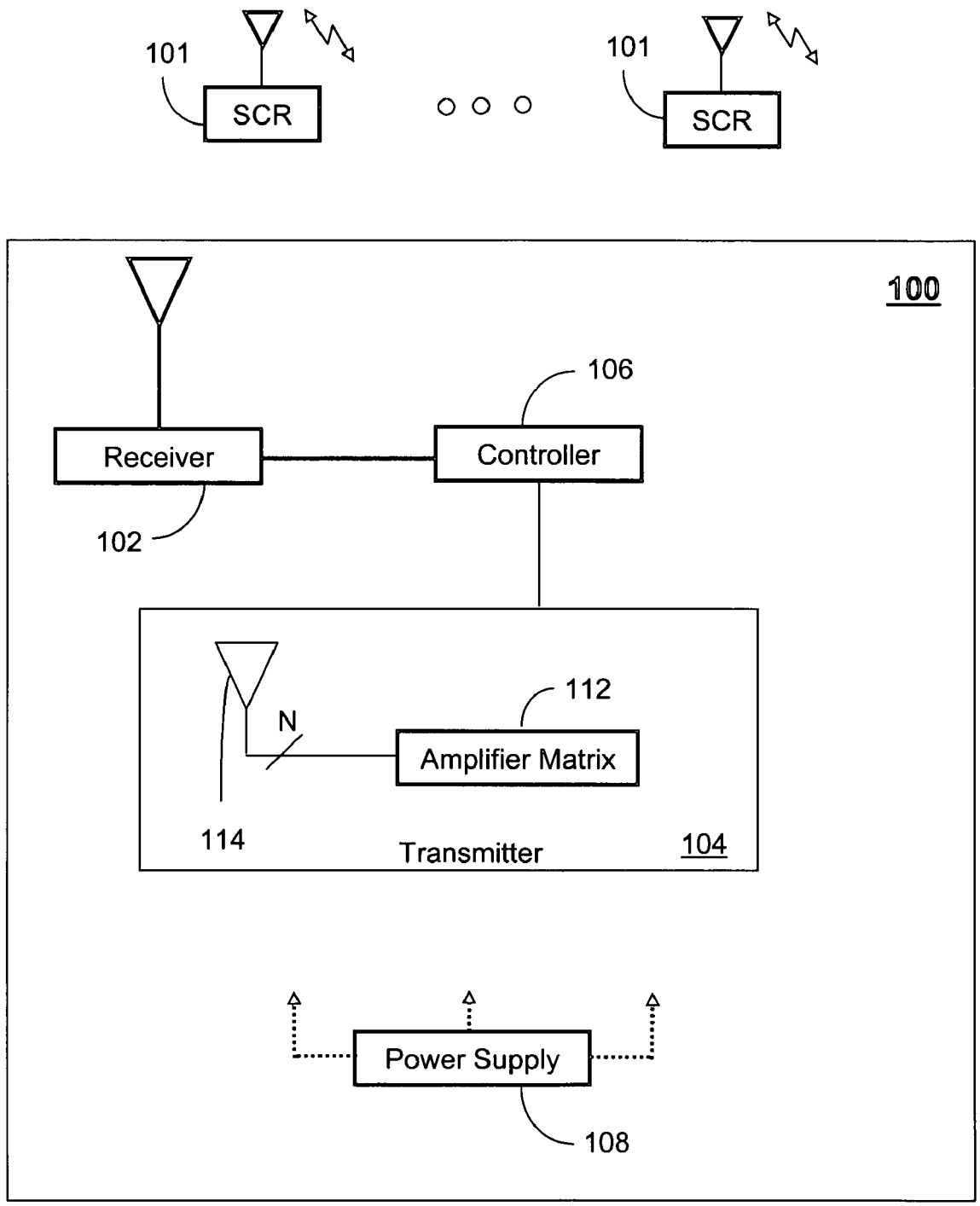
FIG. 3 is a block diagram of a base station in accordance with an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

FIG. 3 is a block diagram of a base station 100 in accordance with an embodiment of the present invention. The base station 100 comprises a conventional receiver 102 for intercepting signals from one or more selective call radios (SCRs) 101, a transmitter 104 for radiating message signals directed to the SCRs 101, and a conventional controller 106. The controller 106 can utilize one or more computing devices such as microprocessors, and/or DSPs (Digital Signal Processors) each with associated storage media for controlling operations of the receiver 102 and the transmitter 104.

The transmitter 104 comprises an amplifier matrix 112 coupled to a plurality of antennas 114 for radiating message signals to selective call radios (SCRs). Signals delivered to the amplifier matrix 112 can be baseband signals generated by the controller 106 having an embedded message intended for processing by a user of the SCR 101.

The foregoing components of the base station 100 can be powered by a conventional power supply 108.

Figure 4:
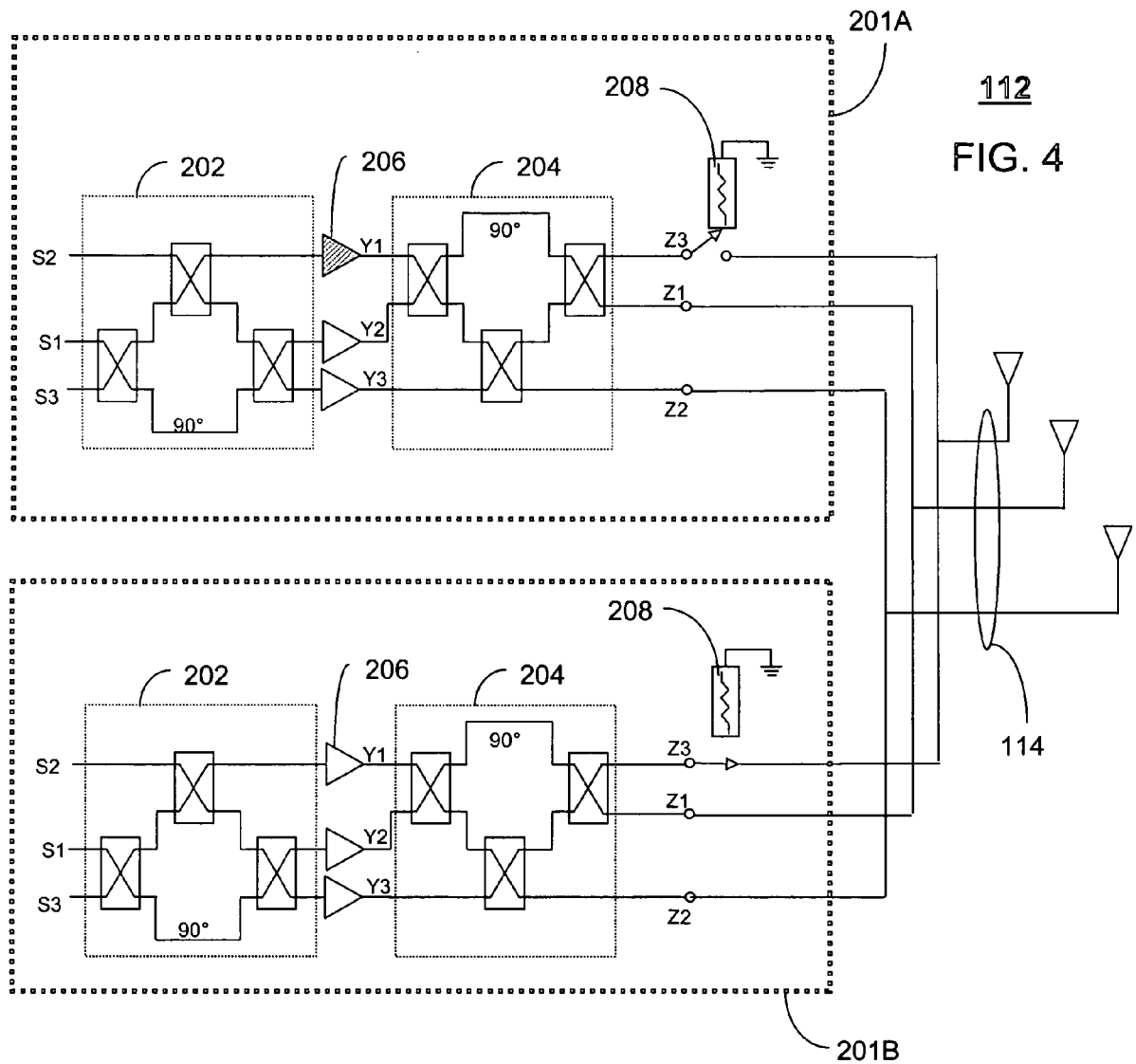
FIGS. 4 and 5 depict block diagrams of an amplifier matrix of the base station in accordance with an embodiment of the present invention.
Figure 5:
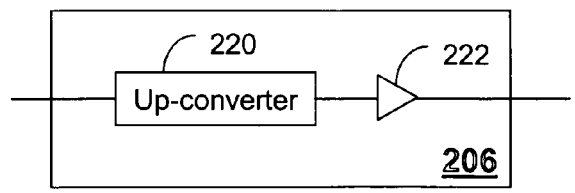

FIGS. 4 and 5 depict block diagrams of the amplifier matrix 112 in accordance with an embodiment of the present invention. The amplifier matrix 112 comprises a plurality of inter-coupled matrix clusters 201 (only two are shown for illustration). Each matrix cluster 201 comprises a digital matrix 202, an analog matrix 204, and up-converted amplifiers 206 coupled therebetween. The outputs of the analog matrix 204 are coupled to the antennas 114, and can be individually decoupled to a conventional load 208. The up-converted amplifiers 206 can comprise a conventional up-converter 220 and a corresponding conventional amplifier 222 as shown in FIG. 5. Utilizing conventional technology, the up-converter 220 transforms the operating frequency of the baseband signals supplied by the digital matrix 202 to a carrier signal operating at a carrier frequency such as, for example, 880 MHz (a typical cellular carrier band). The amplifiers 222 supply to the analog matrix 204 amplified up-converted signals for further processing.

Figure 6:
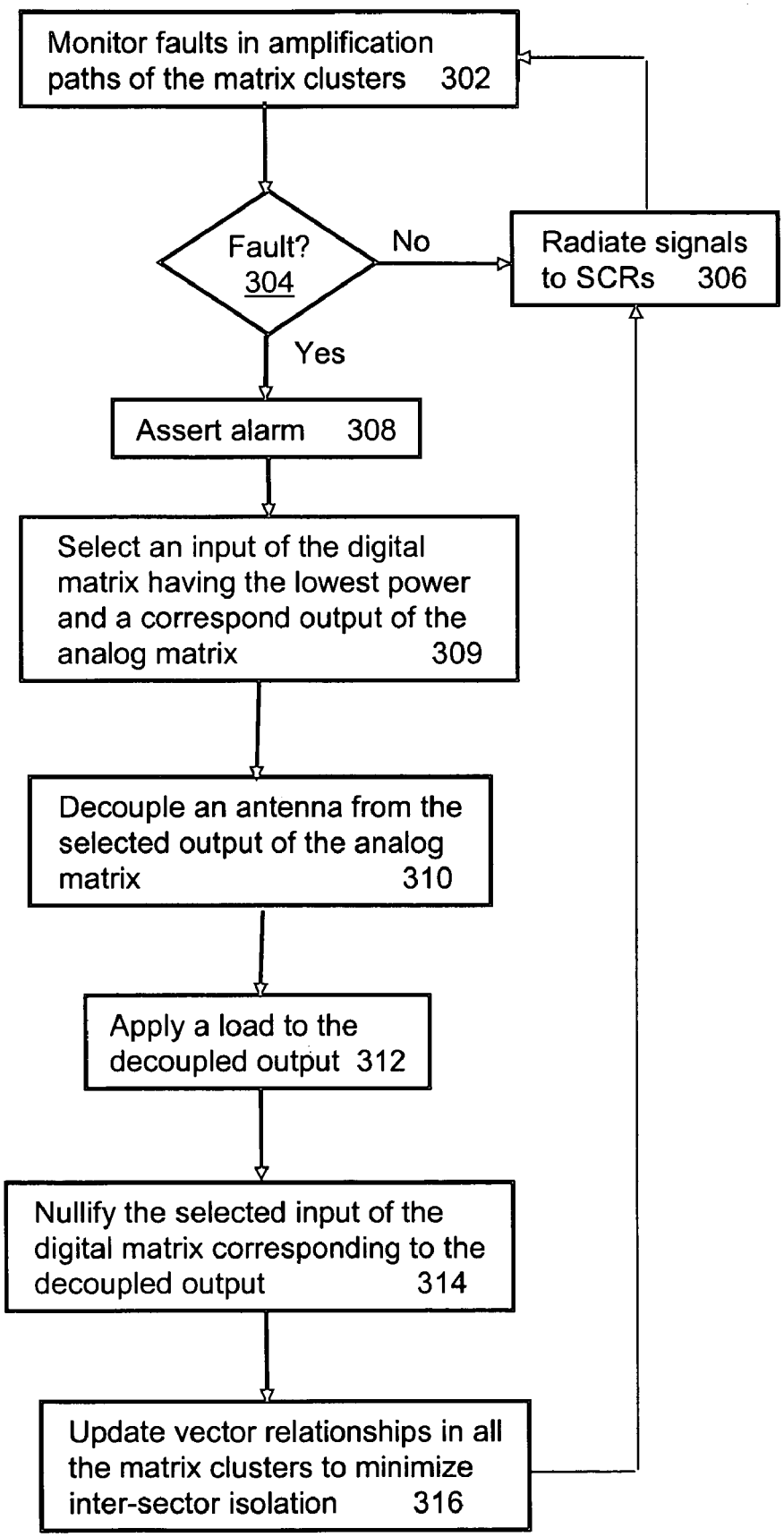
FIG. 6 depicts a flowchart of a method operating in a transmitter of the base station in accordance with embodiments of the present invention.

FIG. 6 depicts a flowchart of a method 300 operating in the transmitter 104 of the base station 100 in accordance with embodiments of the present invention. Method 300 begins with step 302 where the controller 106 utilizes conventional methods to monitor faults in the amplification paths of the matrix clusters 201 shown in FIG. 4. If a no fault is detected in step 304, the controller 106 proceeds to step 306 where it radiates signals to the SCRs 101 in accordance with normal operations. If, on the other hand, a fault is detected (such as an inoperable amplifier 206), the controller 106 asserts an alarm in step 308. The alarm can, for example, notify personnel of an infrastructure carrier managing the base station 100 of the fault. The notification can be an email, an over-the-air message, or other form of notification suitable for the carrier's business operations.

In step 309, the controller 106 is programmed to select an input of the digital matrix 202 having the lowest power and a corresponding output of the analog matrix 204. In steps 309, 310 and 312, the controller 106 takes a first mitigation step which is to decouple the antenna from the output of the analog matrix 204 selected in step 309 of the affected matrix cluster 201A and apply a load to the decoupled output. These steps are shown in cluster 201A of FIG. 4 on output Z3. The controller 106 can be further programmed in step 314 to nullify the input (S3) of the digital matrix 202 selected in step 309 corresponding to the decoupled output Z3. From these steps, the controller 106 in step 316 updates vector relationships in the matrix clusters 201A and 201B to minimize inter-sector isolation at the outputs of the matrix clusters.

Steps 310 through 316 can be explained mathematically from the illustrations of FIG. 4. For the affected cluster 201A, the following relationships apply:

$$\vec{Y}_{2A} = Y_{S_1A} \cdot \vec{S}_1 \angle 90° + Y_{S_2A} \cdot \vec{S}_2 \angle -120° + 0 \cdot \vec{S}_3$$

$$\vec{Y}_{3A} = Y_{S_1A} \cdot \vec{S}_1 \angle 180° + Y_{S_2A} \cdot \vec{S}_2 \angle -150° + 0 \cdot \vec{S}_3$$

$$S_{1A\_AvailablePower} = \left(\frac{S_{1A\_OriginalPower}}{S_{1A\_OriginalPower} + S_{2A\_OriginalPower}}\right)\left(\frac{CLA\_Total\_Available\_Power}{2}\right)$$

$$S_{2A\_AvailablePower} = \left(\frac{S_{2A\_OriginalPower}}{S_{1A\_OriginalPower} + S_{2A\_OriginalPower}}\right)\left(\frac{CLA\_Total\_Available\_Power}{2}\right)$$

$$S_{1\_APower} = \text{MIN}(S_{1A\_OriginalPower}, S_{1A\_AvailablePower})$$

$$S_{2A\_Power} = \text{MIN}(S_{2A\_OriginalPower}, S_{2A\_AvailablePower})$$

$$Y_{S_1A} = \sqrt{\frac{S_{1A\_Power}}{S_{1A\_OriginalPower}}}$$

$$Y_{S_2A} = \sqrt{\frac{S_{2A\_Power}}{S_{2A\_OriginalPower}}}$$

In the above equations, CLA represents matrix cluster 201A. The term "CLA Total Available Power" refers to the maximum summed power capability of the enabled amplification paths. This term is divided by two because half of the power will be dissipated in a load, while the other half is available to be radiated at the antennae. For the unaffected matrix cluster 201B, the following relationships apply:

$$\vec{Y}_{1B} = Y_{S_1B} \cdot \vec{S}_1 \angle -90° + Y_{S_2B} \cdot \vec{S}_2 \angle 0° + Y_{S_3B} \cdot \vec{S}_3 \angle -180°$$

$$\vec{Y}_{2B} = Y_{S_1B} \cdot \vec{S}_1 \angle 60° + Y_{S_2B} \cdot \vec{S}_2 \angle -90° + Y_{S_3B} \cdot \vec{S}_3 \angle -150°$$

$$\vec{Y}_{3B} = Y_{S_1B} \cdot \vec{S}_1 \angle -150° + Y_{S_2B} \cdot \vec{S}_2 \angle -180° + Y_{S_3B} \cdot \vec{S}_3 \angle -120°$$

$$S_{1B\_DesiredPower} = (\text{Total\_Original\_S1\_Frame\_Power}) - S_{1A\_Power}$$

$$S_{2B\_DesiredPower} = (\text{Total\_Original\_S2\_Frame\_Power}) - S_{2A\_Power}$$

$$S_{3B\_DesiredPower} = (\text{Total\_Original\_S3\_Frame\_Power}) - S_{3A\_Power}$$

$$S_{1B\_AvailablePower} = \left(\frac{S_{1B\_DesiredPower}}{S_{1B\_DesiredPower} + S_{2B\_DesiredPower} + S_{3B\_DesiredPower}}\right)$$
$$(\text{CLB\_Total\_Available\_Power})$$

$$S_{2B\_AvailablePower} = \left(\frac{S_{2B\_DesiredPower}}{S_{1B\_DesiredPower} + S_{2B\_DesiredPower} + S_{3B\_DesiredPower}}\right)$$
$$(\text{CLB\_Total\_Available\_Power})$$

$$S_{3B\_AvailablePower} = \left(\frac{S_{3B\_DesiredPower}}{S_{1B\_DesiredPower} + S_{2B\_DesiredPower} + S_{3B\_DesiredPower}}\right)$$
$$(\text{CLB\_Total\_Available\_Power})$$

$$S_{1B\_Power} = \text{MIN}(S_{1B\_DesiredPower}, S_{1B\_DesiredPower})$$

$$S_{2B\_Power} = \text{MIN}(S_{2B\_DesiredPower}, S_{2B\_DesiredPower})$$

$$S_{3B\_Power} = \text{MIN}(S_{2B\_DesiredPower}, S_{2B\_DesiredPower})$$

$$Y_{S_1B} = \sqrt{\frac{S_{1B\_Power}}{3S_{1B\_OriginalPower}}}$$

$$Y_{S_2B} = \sqrt{\frac{S_{2B\_Power}}{3S_{2B\_OriginalPower}}}$$

$$Y_{S_3B} = \sqrt{\frac{S_{3B\_Power}}{3S_{3B\_OriginalPower}}}$$

Similar to the prior equations, CLB represents matrix cluster 201B.

FIG. 7 depicts a table comparing operating results of the transmitter 104 before and after the fault is corrected in accordance method 300 described earlier. In this table, sectors S1 through S3 are assumed to output 40, 30, and 10 Watts, respectively, and each amplification path has a maximum power capability of 20 W. Applying the above equations to the affected matrix cluster 201A with these assumptions leads to the following results:

$$S_{1A\_AvailablePower} =$$
$$\left(\frac{S_{1A\_OriginalPower}}{S_{1A\_OriginalPower} + S_{2A\_OriginalPower}}\right)\left(\frac{\text{CLA\_Total\_Available\_Power}}{2}\right) =$$
$$\left(\frac{20}{35}\right)\left(\frac{40}{2}\right) = 11.4 \text{ W}$$

$$S_{2A\_AvailablePower} =$$
$$\left(\frac{S_{2A\_OriginalPower}}{S_{1A\_OriginalPower} + S_{2A\_OriginalPower}}\right)\left(\frac{\text{CLA\_Total\_Available\_Power}}{2}\right) =$$
$$\left(\frac{15}{35}\right)\left(\frac{40}{2}\right) = 8.6 \text{ W}$$

-continued $$S_{1A\_Power} = \text{MIN}(S_{1A\_OriginalPower}, S_{1A\_AvailablePower}) = 11.4 \text{ W}$$

$$S_{2A\_Power} = \text{MIN}(S_{2A\_OriginalPower}, S_{2A\_AvailablePower}) = 8.6 \text{ W}$$

$$Y_{S_1A} = \sqrt{\frac{S_{1A\_Power}}{S_{1A\_OriginalPower}}} = 0.756$$

$$Y_{S_2A} = \sqrt{\frac{S_{2A\_Power}}{S_{2A\_OriginalPower}}} = 0.756$$

$$\vec{Y}_{2A} = 0.756 \cdot \vec{S}_1 \angle 90° + 0.756 \cdot \vec{S}_2 \angle -120° + 0 \cdot \vec{S}_3$$

$$\vec{Y}_{3A} = 0.756 \cdot \vec{S}_1 \angle 180° + 0.756 \cdot \vec{S}_2 \angle -150° + 0 \cdot \vec{S}_3$$

$$\vec{Z}_{1A} = 0.436 \cdot \vec{S}_1 \angle 150° + 0.436 \cdot \vec{S}_2 \angle -60° +$$
$$0.436 \cdot \vec{S}_1 \angle 90° + 0.436 \cdot \vec{S}_2 \angle 120° = 0.756 \cdot \vec{S}_1 \angle 120°$$

$$\vec{Z}_{2A} = 0.436 \cdot \vec{S}_1 \angle 0° + 0.436 \cdot \vec{S}_2 \angle 150° + 0.436 \cdot \vec{S}_1 \angle 180° +$$
$$0.436 \cdot \vec{S}_2 \angle -150° = 0.756 \cdot \vec{S}_2 \angle 180°$$

Applying the above equations to the unaffected matrix cluster 201B with these assumptions leads to the following results:

$$S_{1B\_DesiredPower} =$$
$$(\text{Total\_Original\_S1\_Frame\_Power}) - S_{1A\_Power} = 40 - 11.4 = 28.6 \text{ W}$$

$$S_{2B\_DesiredPower} =$$
$$(\text{Total\_Original\_S2\_Frame\_Power}) - S_{2A\_Power} = 30 - 8.6 = 21.4 \text{ W}$$

$$S_{3B\_DesiredPower} =$$
$$(\text{Total\_Original\_S3\_Frame\_Power}) - S_{3A\_Power} = 10 - 0 = 10 \text{ W}$$

$$S_{1B\_AvailablePower} = \left(\frac{S_{1B\_DesiredPower}}{S_{1B\_DesiredPower} + S_{2B\_DesiredPower} + S_{3B\_DesiredPower}}\right)$$
$$(\text{CLB\_Total\_Available\_Power}) = \left(\frac{28.6}{60}\right)(60) = 28.6 \text{ W}$$

$$S_{2B\_AvailablePower} = \left(\frac{S_{2B\_DesiredPower}}{S_{1B\_DesiredPower} + S_{2B\_DesiredPower} + S_{3B\_DesiredPower}}\right)$$
$$(\text{CLB\_Total\_Available\_Power}) = \left(\frac{21.4}{60}\right)(60) = 21.4 \text{ W}$$

$$S_{3B\_AvailablePower} = \left(\frac{S_{3B\_DesiredPower}}{S_{1B\_DesiredPower} + S_{2B\_DesiredPower} + S_{3B\_DesiredPower}}\right)$$
$$(\text{CLB\_Total\_Available\_Power}) = \left(\frac{10}{60}\right)(60) = 10 \text{ W}$$

$$S_{1B\_Power} = \text{MIN}(S_{1B\_DesiredPower}, S_{1B\_AvailablePower}) = 28.6 \text{ W}$$

$$S_{2B\_Power} = \text{MIN}(S_{2B\_DesiredPower}, S_{2B\_AvailablePower}) = 21.4 \text{ W}$$

$$S_{3B\_Power} = \text{MIN}(S_{2B\_DesiredPower}, S_{2B\_AvailablePower}) = 10 \text{ W}$$

$$Y_{S_1B} = \sqrt{\frac{S_{1B\_Power}}{3S_{1B\_OriginalPower}}} = \sqrt{\frac{28.6}{60}} = 0.69$$

$$Y_{S_2B} = \sqrt{\frac{S_{2B\_Power}}{3S_{2B\_OriginalPower}}} = \sqrt{\frac{21.4}{45}} = 0.69$$

$$Y_{S_3B} = \sqrt{\frac{S_{3B\_Power}}{3S_{3B\_OriginalPower}}} = \sqrt{\frac{10}{15}} = \sqrt{\frac{2}{3}}$$

-continued $$\vec{Y}_{1B} = 0.69 \cdot \vec{S}_1 \angle -90° + 0.69 \cdot \vec{S}_2 \angle 0° + \sqrt{\frac{2}{3}} \cdot \vec{S}_3 \angle -180°$$

$$\vec{Y}_{2B} = 0.69 \cdot \vec{S}_1 \angle 60° + 0.69 \cdot \vec{S}_2 \angle -90° + \sqrt{\frac{2}{3}} \cdot \vec{S}_3 \angle -150°$$

$$\vec{Y}_{3B} = 0.69 \cdot \vec{S}_1 \angle -150° + 0.69 \cdot \vec{S}_2 \angle -180° + \sqrt{\frac{2}{3}} \cdot \vec{S}_3 \angle -120°$$

$$\vec{Z}_{1B} = 1.2 \cdot \vec{S}_1 \angle 120°$$

$$\vec{Z}_{2B} = 1.2 \cdot \vec{S}_2 \angle 180°$$

$$\vec{Z}_{3B} = \sqrt{2} \cdot \vec{S}_3 \angle 60°$$

FIG. 7 shows the results of these calculations, assuming ideal combining of clusters A and B, and the results if no modification takes place in accordance with method 300. If the matrix clusters 201A and 201B remain unmodified (i.e., method 300 is not applied), cluster 201A will generate at 8.9 Watts at Z1 for sector 1 (S1), 6.7 Watts at Z2 for S2, and 2.2 Watts at Z3 for S3. Each of Z1 through Z3 for non-corresponding sectors will receive a total noise term ranging between 2.3 Watts and 3.9 Watts as indicated in FIG. 7. Matrix cluster 201B, on the other hand, will generate 20 Watts at Z1 for S1, 15 Watts at Z2 for S2, and 5 Watts at Z3 for S3. All other non-corresponding sectors will receive 0 Watts as expected. The resulting desired sector power at Z1 is 28.9 Watts with an isolation of −11 dBc, the resulting desired sector power at Z2 is 21.7 Watts with an isolation of −8.9 dBc, and the resulting desired sector power at Z3 is 7.2 Watts with an isolation of −2.7 dBc. Generally, an isolation less than −15 dBc is considered unacceptable. Present systems are requiring isolation as high as −25 dBc. Clearly, the unmodified matrix cluster 201A falls short of this goal.

Compare, on the other hand, the performance of the clusters 201A and 201B modified in accordance with method 300. Cluster 201A will generate 11.4 Watts at Z1 for S1, 8.6 Watts for Z2 for S2, and 0 Watts at Z3 for S3. Each of Z1 through Z3 for non-corresponding sectors will generate 0 Watts of noise. Matrix cluster 201B will generate 28.6 Watts at Z1 for S1, 21.4 Watts at Z2 for S2, and 10 Watts at Z3 for S3. All other non-corresponding sectors will generate 0 Watts also. The resulting desired sector power at Z1 is 40 Watts, at Z2 it is 30 Watts, and at Z3 it is 10 Watts with ideally infinite dBc isolation across all sectors. Obviously, the results presented in the modified clusters 201A and 201B is far superior to prior art systems with no fault-tolerance capability.

It should be evident to an artisan with skill in the art that portions of embodiments of the present invention can be embedded in a computer program product, which comprises features enabling the implementation stated above. A computer program in the present context means any expression, in any language, code or notation, of a set of instructions intended to cause a system having an information processing capability to perform a particular function either directly or after either or both of the following: a) conversion to another language, code or notation; b) reproduction in a different material form.

It should also be evident that the present invention can be realized in hardware, software, or combinations thereof. Additionally, the present invention can be embedded in a computer program, which comprises all the features enabling the implementation of the methods described herein, and which enables said devices to carry out these methods. A computer program in the present context means any expression, in any language, code or notation, of a set of instructions intended to cause a system having an information processing capability to perform a particular function either directly or after either or both of the following: a) conversion to another language, code or notation; b) reproduction in a different material form. Additionally, a computer program can be implemented in hardware as a state machine without conventional machine code as is typically used by CISC (Complex Instruction Set Computers) and RISC (Reduced Instruction Set Computers) processors.

The present invention may also be used in many arrangements. For example, the digital and analog matrixes 202 and 204 can utilize other dimensions such as, for example, 3 by 3, 4 by 4, 6 by 6, or 8 by 8 matrixes, just to mention a few. Method 300 in FIG. 6 can be simplified by integrating steps 314 and 316 in a single step. Portions of the embodiments described above can also be reconfigured to work with other matrix implementations. For instance, instead of using a digital matrix 202 operating at baseband, a programmable analog input matrix could be used. The up-converters 220 in this configuration could be placed prior to the analog input matrix, and the vector relationships could be controlled via a combination of gain and phase adjusters such that similar results as described above can be attained. Thus, although the description is made for particular arrangements and methods, the intent and concept of the invention is suitable and applicable to other arrangements and applications not described herein. The embodiments of method 300 therefore can in numerous ways be modified with additions thereto without departing from the spirit and scope of the invention.

Accordingly, the described embodiments ought to be construed to be merely illustrative of some of the more prominent features and applications of the invention. It should also be understood that the claims are intended to cover the structures described herein as performing the recited function and not only structural equivalents. Therefore, equivalent structures that read on the description are to be construed to be inclusive of the scope of the invention as defined in the following claims. Thus, reference should be made to the following claims, rather than to the foregoing specification, as indicating the scope of the invention.

What is claimed is:

1. An amplifier matrix, comprising:
    a plurality of inter-coupled matrix clusters wherein each of the plurality of inter-coupled matrix clusters includes at least a first matrix and a second matrix and wherein each output of the first matrix is coupled to one of each of the inputs of the second matrix; and
    a controller programmed to:
    detect a fault in an amplification path of one of the plurality of inter-coupled matrix clusters; and
    update vector relationships in all of the plurality of inter-coupled matrix clusters to minimize inter-sector isolation at outputs of the plurality of inter-coupled matrix clusters caused by the fault by selecting the input of the first matrix having the lowest power of all the plurality of inter-coupled matrix clusters and the corresponding output of the second matrix to update the vector relationship.

2. The amplifier matrix of claim 1, wherein each matrix cluster comprises:
    a digital matrix;
    a plurality of up-converters coupled to the outputs of the digital matrix;
    a plurality of amplifiers coupled to the outputs of the up-converters; and an analog matrix coupled to the outputs of the plurality of amplifiers.

3. The amplifier matrix of claim 2, comprising a plurality of antennas coupled to the outputs of the analog matrix for radiating message signals to a plurality of selective call radios (SCRs).

4. The amplifier matrix of claim 3, wherein the controller is programmed to:
    decouple an antenna from one of the outputs of the analog matrix of the affected matrix cluster; and
    apply a load to said decoupled output.

5. The amplifier matrix of claim 4, wherein the controller is programmed to nullify an input of the digital matrix corresponding to the decoupled output.

6. The amplifier matrix of claim 5, wherein the controller is programmed to select the input of the digital matrix having the lowest power and the corresponding output of the analog matrix for the nullifying and decoupling steps, respectively.

7. The amplifier matrix of claim 1, wherein the controller is programmed to assert an alarm upon detecting a fault in the matrix clusters.

8. A computer-readable storage medium in an amplifier matrix comprising a plurality of inter-coupled matrix clusters, comprising computer instructions for:
    detecting a fault in an amplification path of one of the plurality of inter-coupled matrix clusters wherein each of the plurality of inter-coupled matrix clusters includes at least a first matrix and a second matrix and wherein each output of the first matrix is coupled to one of each of the inputs of the second matrix; and
    updating vector relationships in all of the plurality of inter-coupled matrix clusters to minimize inter-sector isolation at the outputs of the plurality of inter-coupled matrix clusters caused by the fault by selecting the input of the first matrix having the lowest power of all of the plurality of inter-coupled matrix clusters and the corresponding output of the second matrix to update the vector relationship.

9. The storage medium of claim 8, wherein each matrix cluster comprises:
    a digital matrix;
    a plurality of up-converters coupled to the outputs of the digital matrix;
    a plurality of amplifiers coupled to the outputs of the up-converters; and
    an analog matrix coupled to the outputs of the plurality of amplifiers.

10. The storage medium of claim 9, wherein the amplifier matrix comprises a plurality of antennas coupled to the outputs of the analog matrix for radiating signals to a plurality of selective call radios (SCRs).

11. The storage medium of claim 10, comprising computer instructions for:
    decoupling an antenna from one of the outputs of the analog matrix of the affected matrix cluster; and
    applying a load to said decoupled output.

12. The storage medium of claim 11, comprising computer instructions for nullifying an input of the digital matrix corresponding to the decoupled output.

13. The storage medium of claim 12, further comprising computer instructions for selecting the input of the digital matrix having the lowest power and the corresponding output of the analog matrix for the nullifying and decoupling steps, respectively.

14. The storage medium of claim 8, comprising computer instructions for asserting an alarm upon detecting a fault in the matrix clusters.

15. A base station, comprising:
    a controller;
    a receiver; and
    a transmitter, comprising:
    an amplifier matrix comprising a plurality of inter-coupled matrix clusters wherein each of the plurality of inter-coupled matrix clusters includes at least a first matrix and a second matrix and wherein each output of the first matrix is coupled to one of each of the inputs of the second matrix; and
    a plurality of antennas coupled to the outputs of the amplifier matrix for radiating message signals to selective call radios (SCRs);
    wherein the controller is programmed to:
    detect a fault in an amplification path of one of the plurality of inter-coupled matrix clusters; and
    update vector relationships in all of the plurality of inter-coupled matrix clusters to minimize inter-sector isolation at outputs of the plurality of inter-coupled matrix clusters caused by the fault by selecting the input of the first matrix having the lowest power of all of the plurality of inter-coupled matrix clusters and the corresponding output of the second matrix to update the vector relationship; and
    radiate signals from the transmitter to one or more SCRs.

16. The base station of claim 15, wherein each matrix cluster comprises:
    a digital matrix;
    a plurality of up-converters coupled to the outputs of the digital matrix;
    a plurality of amplifiers coupled to the outputs of the up-converters; and
    an analog matrix coupled to the outputs of the plurality of amplifiers.

17. The base station of claim 16, wherein the controller is programmed to:
    decouple an antenna from one of the outputs of the analog matrix of the affected matrix cluster; and
    apply a load to said decoupled output.

18. The base station of claim 17, wherein the controller is programmed to nullify an input of the digital matrix corresponding to the decoupled output.

19. The base station of claim 18, wherein the controller is programmed to select the input of the digital matrix having the lowest power and the corresponding output of the analog matrix for the nullifying and decoupling steps, respectively.

20. The base station of claim 15, wherein the controller is programmed to assert an alarm upon detecting a fault in the matrix clusters.

* * * * *